(12) United States Patent
Emer et al.

(10) Patent No.: US 6,420,677 B1
(45) Date of Patent: Jul. 16, 2002

(54) LASER MACHINING COOLING HOLES IN GAS TURBINE COMPONENTS

(75) Inventors: George Emer, Cresskill; Frank Wos, Landing, both of NJ (US); Dmitriy Romin, Brooklyn, NY (US)

(73) Assignee: Chromalloy Gas Turbine Corporation, Orangeburg, NY (US)

( * ) Notice: Subject to any disclaimer, the term of this patent is extended or adjusted under 35 U.S.C. 154(b) by 0 days.

(21) Appl. No.: 09/741,727

(22) Filed: Dec. 20, 2000

(51) Int. Cl.[7] .............................................. B23K 26/00
(52) U.S. Cl. ........................ 219/121.71; 219/121.72; 219/121.67; 219/121.7; 219/121.68
(58) Field of Search ....................... 219/121.71, 121.72, 219/121.67, 121.7, 121.68

(56) References Cited

U.S. PATENT DOCUMENTS

| | | | |
|---|---|---|---|
| 4,737,613 A | | 4/1988 | Frye ............................. 219/121 |
| 4,762,464 A | | 8/1988 | Vertz et al. ..................... 416/97 |
| 5,223,692 A | * | 6/1993 | Lozier et al. ............ 219/121.67 |
| 5,609,779 A | * | 3/1997 | Crow et al. ............. 219/121.71 |
| 5,683,600 A | * | 11/1997 | Kelley et al. ........... 219/121.71 |
| 5,739,502 A | | 4/1998 | Anderson et al. ....... 219/121.71 |
| 5,837,964 A | * | 11/1998 | Emer et al. ............. 219/121.71 |
| 6,307,175 B1 | * | 10/2001 | Blochinger et al. .... 219/121.71 |

FOREIGN PATENT DOCUMENTS

| | | | |
|---|---|---|---|
| EP | 0365195 | 3/1996 | ............. F01D/5/18 |
| EP | 0748469 | 10/1997 | ......... G05B/19/402 |

* cited by examiner

*Primary Examiner*—M. Alexandra Elve
(74) *Attorney, Agent, or Firm*—Mitchell D. Bittman

(57) ABSTRACT

The present invention provides a method of laser machining a cooling hole in a hollow gas turbine component, the cooling hole including a circular cross section metering hole and a diffuser with an opening which extends from a shape locus in the metering hole to a trapezoidal cross section opening by firing a series of laser pulses at an acute angle at the outer surface of the component toward the shape locus to create the diffuser opening, with the laser pulses penetrating the component outer surface up to but not substantially beyond the shape locus, then firing the laser through the shape locus and the inner surface of the component to create the metering hole having a circular cross section. Alternatively, the initial laser pulses are fired to create the central portion of the diffuser opening, then firing the laser to create the metering hole, followed by firing the laser along the peripheral portion of the diffuser opening.

11 Claims, 3 Drawing Sheets

Table 1

| Pt | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A | 0 | 0 | 3.33 | 3.33 | 3.33 | 3.33 | 6.66 | 6.66 | 6.66 | 6.66 | 6.66 | 10 | 10 | 10 | 10 |
| B | 5 | -5 | -6 | -2 | 2 | 6 | 6.66 | 3.33 | 0 | -3.33 | -6.66 | -7.5 | -5 | -2.5 | 2.5 |

| Pt | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| A | 10 | 10 | 10 | 6.66 | 3.33 | 0 | -3.33 | -3.33 | 10 | 6.66 | 3.33 | 0 | -3.33 | -3.33 | -3.33 |
| B | 5 | 7.5 | 10 | 10 | 10 | 10 | 10 | 5 | -10 | -10 | -10 | -10 | -10 | -5 | 0 |

LASER MACHINING COOLING HOLES IN GAS TURBINE COMPONENTS

BACKGROUND OF THE INVENTION

The present invention relates to manufacturing gas turbine engine components and, more particularly, to drilling a cooling hole with a diffuser opening through the surface of a gas turbine engine component using only a laser beam in a single laser drilling operation.

Gas turbine components, such as blades, vanes and the like, operating in high temperature gas are often hollow with an air coolant passageway therethrough. openings through the blade from the inner coolant passage permit the coolant air to flow out thereby permitting a coolant flow passing coolant air through the material of the component itself to cool it and also providing a film cooling of the outer surface of the component. A diffuser shape of the opening lowers the terminal velocity thereby increasing the effectiveness of the film cooling of the component surface.

To facilitate the distribution of the coolant air substantially completely over the convex and concave surfaces of the blade airfoil or platform, the hole openings are preferably shaped like a trapezoid with the downstream portion of each hole opening, at the airfoil surface, flaring or widening relative to the narrower upstream portion of each hole opening. The increasing cross-sectional area of the hole opening functions as a diffuser to reduce the velocity of the cooling airstreams exiting the holes; the lower velocity airstreams are more inclined to cling to the blade surface for improved cooling rather than separate from the blade.

One method and apparatus for forming a shaped cooling hole in an airfoil, similar to that described above, is disclosed in U.S. Pat. No. 4,808,785 to Vertz et al. Vertz discloses basically a two step process using Electric Discharge Machining (EDM) and laser drilling; an EDM step is performed to create the diffuser-shaped hole opening on the airfoil surface and a laser drilling step is performed to penetrate through the airfoil and into the hollow interior of the blade. The entire process is independent of which step is performed first. This two step process typically takes longer than if the hole with a diffuser-shaped opening could be formed in substantially a single hole drilling or forming operation.

Another method for forming a shaped cooling hole is disclosed in U.S. Pat. No. 4,737,613 to Frye. Frye discloses laser machining a cooling hole in a blade by laser firing to drill through the workpiece at a selected location and with firing continuing moving the laser to other selected locations, with an hourglass shape being machined. While this method is effective in forming a cooling hole, the hourglass shape is not desirable for many applications.

In order to create an effective distribution of cooling air through the diffuser opening while maintaining the strength and integrity of the component wall through which the cooling hole is being drilled, it is desirable that the cooling hole have a metering hole which has a circular cross section of relatively constant diameter leading to a diffuser which has a trapezoidal cross section opening at the surface. It is desirable that gouging or other distortions of the circular cross section shape of the metering hole and/or contamination of the component by debris entering the hollow component and/or back wall strikes by the laser be avoided.

During the laser drilling of cooling holes the hollow gas passages of the component are generally filled with a backer material to absorb or dissipate the excess laser beam energy that exits the cooling hole thus preventing back wall strikes. However, in many instances the amount of backer material is limited as the hollow gas passages of the component are small and narrow. If excess laser energy is permitted to exit the metering hole the backer material can be consumed and the internal back wall of the component (ie. the internal surface facing the exit of the metering hole) can be damaged. Prior art processes which laser drill the metering hole first and then laser drill the diffuser shape result in an excessive amount of laser beam energy exiting the metering hole and can result, not only in gouging and damage to the metering hole shape, but debris entering the component and back wall strikes.

It is accordingly an object of the present inventor to provide a method for laser drilling a cooling hole with a circular cross sectional metering hole and a diffuser opening.

It is another object of this invention to provide a method of laser drilling in a single operation a cooling hole with a diffuser opening which provides a metering hole without gouging or contamination.

SUMMARY OF THE INVENTION

Briefly, the present invention provides a method of laser machining a cooling hole in a hollow gas turbine component, the cooling hole including a circular cross section metering hole which extends from the inner surface of the component and a diffuser with an opening which extends from a shape locus in the metering hole to a trapezoidal cross section opening at the outer surface of the component by firing a series of laser pulses at an acute angle at the outer surface of the component toward the shape locus to create the diffuser opening, with the laser pulses penetrating the component outer surface up to but not substantially beyond the shape locus, then firing the laser through the shape locus and the inner surface of the component to create the metering hole having a circular cross section. In an alternate embodiment the initial laser pulses are fired to create the central portion of the diffuser opening, then firing the laser to create the metering hole, followed by firing the laser along a peripheral portion of the diffuser opening to create the diffuser opening.

DETAILED DESCRIPTION

This invention provides a method of laser machining a cooling hole including a metering hole and a diffuser opening in a hollow gas turbine component. The components can include blades, vanes and the like and such cooling holes may be incorporated, for example, on the leading edge of the airfoil as well as the platform depending upon the design of the component. Such components are typically constructed of superalloys such as nickel or cobalt based superalloys and may have protective coatings such as MCrAlY wherein M can be Ni or Co or a combination of Ni and Co, platinum aluminide, aluminide and ceramic thermal barrier coatings on their surfaces. Alternatively the components can be constructed of a ceramic.

Figure 1:
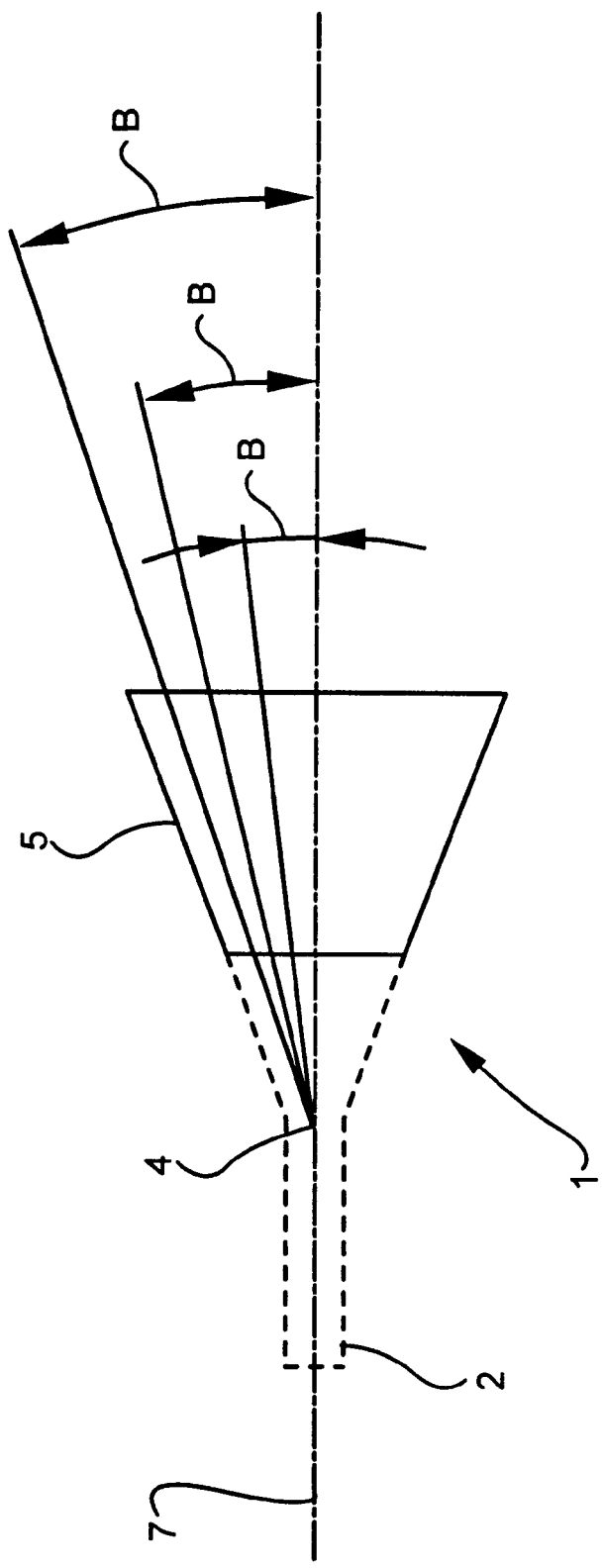
FIG. 1 is a top view of a diffuser opening.
Figure 2:
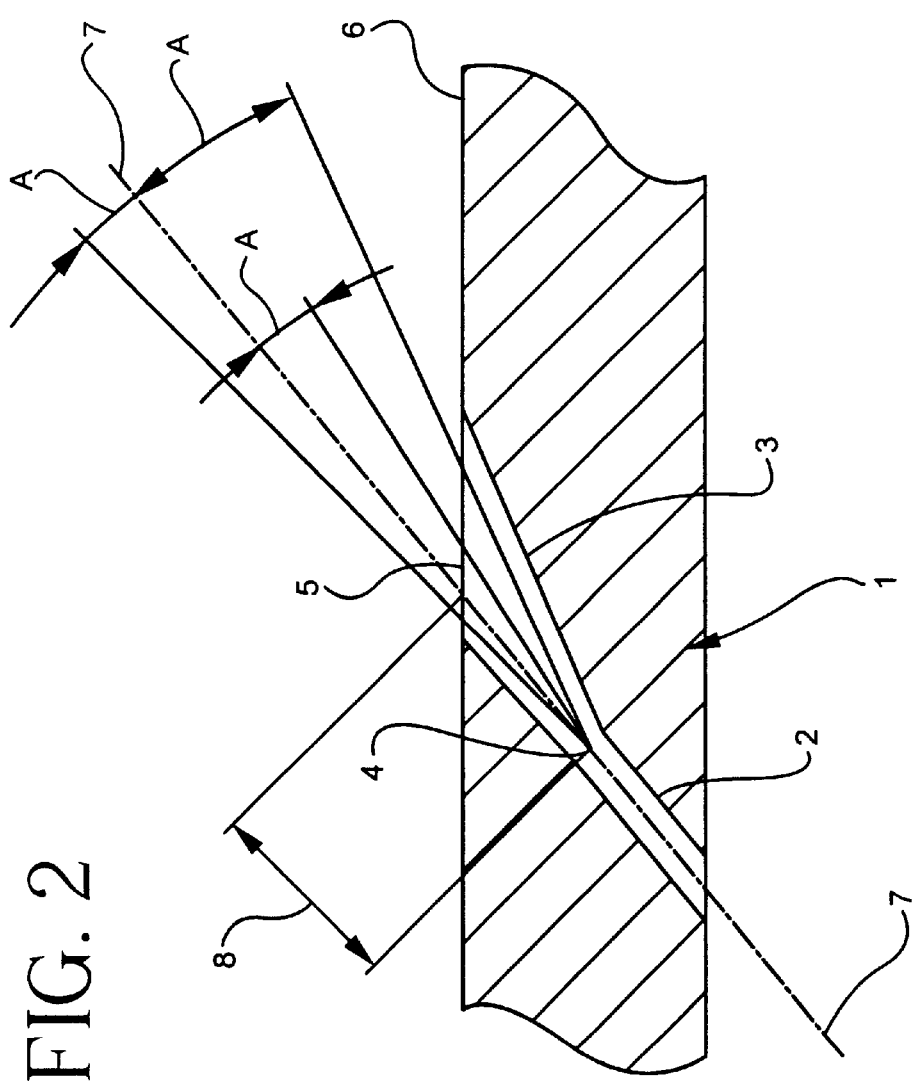
FIG. 2 is a cross sectional view of a cooling hole.
Figure 3:
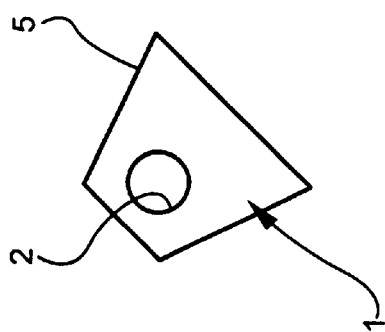
FIG. 3 is an elevational view of the diffuser opening taken along the hole axis 7—7.

Reference to the Figures will be made to describe the cooling hole shape and the laser drilling process of this invention. In FIGS. 1–3 the cooling hole 1 includes a circular cross section metering hole 2 which extends from the inner surface of the component 6 and a diffuser 3 with an opening which extends from a shape locus 4 in the metering hole 2 to a trapezoidal cross section opening 5 at the outer surface of the component 6. The shape locus 4 is defined as the point from which the shape of the opening of the diffuser 3 is formed, with all the laser machining to form the diffuser opening being aimed or directed at this point.

Figure 4:
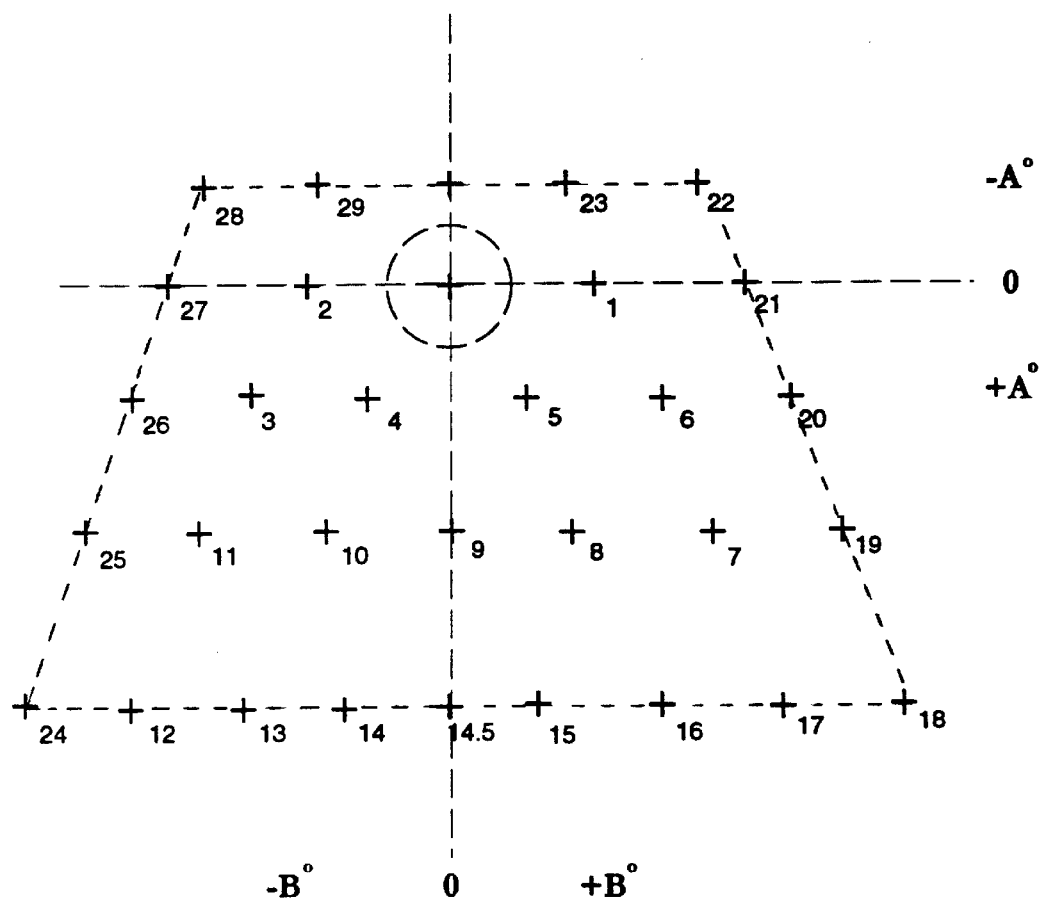
FIG. 4 is a typical schematic illustrating the order of laser pulses for machining a diffuser opening with Table 1 listing the A and B angles for each laser pulse.

The laser machining method fires a series of laser pulses at an acute angle at the outer surface of the component toward the shape locus to create the diffuser opening. Depending upon the desired diffuser shape typically the vertical angle A of the laser position from the hole axis 7—7 varies from −10 to +20 degrees, preferably −5 to +15 degrees, while the horizontal angle B of the laser position from the hole axis 7—7 varies from −20 to +20 degrees, preferably −10 to +10 degrees. An example of a pattern and order for firing the laser is shown in FIG. 4 with Table 1 describing the A and B angles for each laser pulse. Preferably the order of laser firing is such that the central positions (1–11) are first laser drilled, followed by the peripheral positions (12–30) of the diffuser opening being laser drilled. In addition, preferably the laser pulses at the central positions (1–11) drill a hole to a depth which generally make a steady progression towards the shape locus but do not reach the shape locus, while the laser pulses at the peripheral positions (12–30) generally drill a hole which reaches the approximate location of the shape locus. This order of laser pulses has the benefit of minimizing remelt or recast on the diffuser shape surface.

In order to avoid damage to and/or contamination of the metering hole 2 and the wall of the component 6 the power and pulse width of the laser is controlled to penetrate (vaporize) the component material up to but not substantially beyond the shape locus 4. Initial shots may not be fired to the shape depth 8, with the cumulative effect eroding the shape to the shape locus 4, but not substantially beyond. In one embodiment, the series of laser pulses make a steady progression towards the shape locus 4, with the final laser pulses reaching the shape locus 4. In an embodiment, the laser pulse power and width can be adjusted between laser pulses, preferably for a series of the laser pulses, to tailor the laser drilling to drill to a desired depth in forming the desired diffuser shape without damage to the component or the metering hole.

The shaped cavity of the diffuser 3 is formed by pointing the laser at the shape locus 4 along angles A and B and firing the laser a minimum of one shot with sufficient power to penetrate (vaporize) the material. The laser is then repositioned along the next pair of A and B angles and then again fired. These steps are repeated using different combinations of A and B angles until the diffuser shape is complete to specifications. A typical turbine aircraft component with a smaller diffuser shape might require 10 steps, while a large power turbine with a larger diffuser shape may need 60 steps.

After the diffuser opening is formed the metering hole 2 of relatively constant diameter is then formed by firing the laser through the shape locus 4 and the inner surface of the component along the hole axis 7—7. The formation of the metering hole subsequent to the diffuser opening avoids damage to the metering hole and contamination or damage to the internal portion of the component.

In an alternate embodiment after the central portion of the diffuser opening is formed (eg. after central positions 1–11 of FIG. 4 are first laser drilled) the metered hole 2 is then formed by firing the laser through the shape locus 4, followed by laser drilling the peripheral portion of the diffuser opening (eg. peripheral positions 12–30 of FIG. 4 are laser drilled) to form the diffuser opening. This alternative embodiment not only avoids damage to the metering hole and contamination or damage to the internal portion of the component, but also minimizes or eliminates any slag buildup which may occur in the diffuser opening.

To remove any residual recast or slag unfocused laser pulses can be fired at the diffuser opening and/or metering hole.

EXAMPLE I

Diffusion cooling holes were drilled into a turbine blade of a PWA 1483 alloy having a component wall thickness of 0.16 inches (4 mm) with a NiCrAlY coating of a thickness of 0.010 inches (0.25 mm). The parameters of the cooling hole were as follows:

| | |
|---|---|
| Meter Hole Diameter | 0.029 inches (0.75 mm); |
| Shape Depth of | 0.170 inches (4.32 mm); |
| Max Shape Width of | 0.085 inches (2.15 mm); |
| Shape Angle A range of | +10° to −3°; |
| Shape Angle B range of | +10° to −10°; and |
| Angle of metering hole axis to component surface of | 30°0. |

The laser was a solid state ND/YAG type (Neodymium Doped Yttrium Aluminum Garnet Crystal Medium) generating a wavelength of 1060 nm (1.06 um), and operating at a pulse width of 0.4 to 0.8 ms and a pulse frequency of 4 to 8 HZ with an average power range of about 50 watts for the diffuser opening and an average of about 80 watts for the drilling of the metering hole. The optical focus length was 203 mm and the focused beam was delivered to the substrate via a conical nozzle utilizing a coaxial assist gas to aid in the ejection of ablated material each time a laser pulse is fired.

The pulses were fired at a sequence and at the angles shown in FIG. 4 and Table 1 to form the diffuser opening followed by drilling the metering hole. The drilling process avoided damage to the metering hole and contamination or damage to the component. A couple of unfocused laser pulses were fired at the diffuser opening and the metering hole to remove any recast or slag.

EXAMPLE II

Diffusion cooling holes were drilled into a turbine blade of a PWA 1483 alloy having a component wall thickness of 0.16 inches (4 mm) with a NiCrAlY coating of a thickness of 0.010 inches (0.25 mm). The parameters of the cooling hole were as follows:

| | |
|---|---|
| Meter Hole Diameter | 0.029 inches (0.75 mm); |
| Shape Depth of | 0.170 inches (4.32 mm); |
| Max Shape Width of | 0.085 inches (2.15 mm); |
| Shape Angle A range of | +10° to −3°; |
| Shape Angle B ranqe of | +10° to −10°; and |
| Angle of meterinq hole axis to component surface of | 30°0. |

The laser was a solid state ND/YAG type (Neodymium Doped Yttrium Aluminum Garnet Medium) generating a wavelength of 1060 nm (1.06 um), and operating at a pulse width of 0.4 to 0.8 ms and a pulse frequency of 4 to 8 HZ with an average power range of about 50 watts for the diffuser opening and an average of about 80 watts for the drilling of the metering hole. The optical focus length was 203 mm and the focused beam was delivered to the substrate via a conical nozzle utilizing a coaxial assist gas to aid in the ejection of ablated material each time a laser pulse is fired.

The pulses were first fired at a sequence and at the angles shown in FIG. 4 and Table 1 for central positions 1–11 to form the central portion of the diffuser opening, followed by drilling the metering hole, then followed by laser drilling peripheral positions 12–30 to form the diffuser opening. The drilling process avoided damage to the metering hole and contamination or damage to the component. This sequence also minimized any slag or recast buildup at the diffuser opening. A couple of unfocused laser pulses were fired at the diffuser opening and the metering hole to remove any residual recast or slag.

What is claimed:

1. A method of laser machining a cooling hole in a hollow gas turbine component, the cooling hole including a circular cross section metering hole which extends from an inner component surface and a diffuser with an opening which extends from a shape locus in the metering hole to a trapezoidal cross section opening at an outer component surface comprising:

firing a series of laser pulses at an acute angle at the outer component surface toward the shape locus to create the diffuser opening, with the laser pulses penetrating the outer component surface up to but not substantially beyond the shape locus; and then firing the laser through the shape locus and the inner component surface to create the metering hole having a circular cross section.

2. Method of claim 1 wherein the series of laser pulses to create the diffuser opening is first carried out in a central portion of the diffuser opening and then along a peripheral portion of the diffuser opening.

3. Method of claim 2 wherein at least a single laser pulse is fired at each position in creating the diffuser opening.

4. Method of claim 2 wherein the series of laser pulses at the central portion drills holes to a depth which make a steady progression towards the shape locus.

5. Method of claim 1 wherein there is an adjustment of the laser power between laser pulses.

6. Method of claim 1 further comprising firing unfocused laser pulses at the diffuser opening and/or metering hole to remove any residual recast.

7. A method of laser machining a cooling hole in a hollow gas turbine component, the cooling hole including a circular cross section metering hole which extends from an inner component surface and a diffuser with an opening which extends from a shape locus in the metering hole to a trapezoidal cross section opening at an outer component surface comprising:

firing a series of laser pulses at an acute angle at the outer component surface toward the shape locus to create a central portion of the diffuser opening, with the laser pulses penetrating the outer component surface up to but not substantially beyond the shape locus;

then firing the laser through the shape locus and the inner component surface to create the metering hole having a circular cross section; and then firing a series of laser pulses at an acute angle at the outer component surface towards the shape locus along a peripheral portion of the diffuser opening to create the diffuser opening.

8. Method of claim 7 wherein at least a single laser pulse is fired at each position in creating the diffuser opening.

9. Method of claim 7 wherein the series of laser pulses at the central portion drills holes to a depth which make a steady progression towards the shape locus.

10. Method of claim 7 wherein there is an adjustment of the laser power between laser pulses.

11. Method of claim 6 further comprising firing unfocused laser pulses at the diffuser opening and/or metering hole to remove any residual recast.

* * * * *